No. 773,961. PATENTED NOV. 1, 1904.
C. B. MORGAN.
STORAGE BATTERY.
APPLICATION FILED APR. 18, 1904.
NO MODEL.
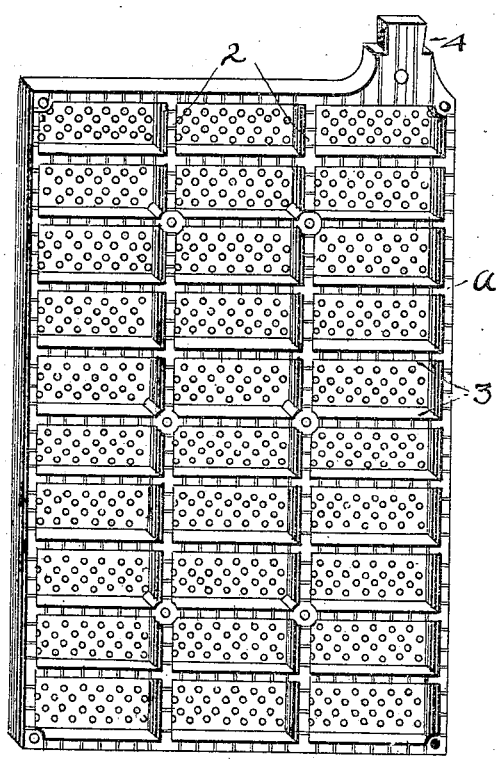
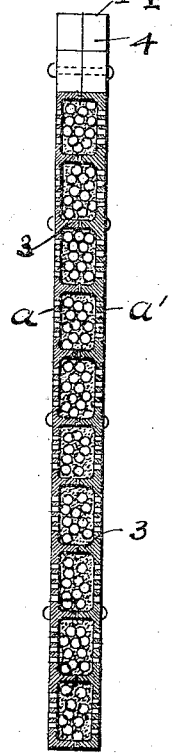
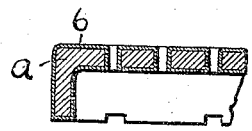
WITNESSES:
INVENTOR.
Charles B. Morgan
BY
ATTORNEY.

No. 773,961. Patented November 1, 1904.

UNITED STATES PATENT OFFICE.

CHARLES B. MORGAN, OF CLEVELAND, OHIO.

STORAGE BATTERY.

SPECIFICATION forming part of Letters Patent No. 773,961, dated November 1, 1904.

Application filed April 18, 1904. Serial No. 203,581. (No model.)

*To all whom it may concern:*

Be it known that I, CHARLES B. MORGAN, a citizen of the United States, residing at Cleveland, in the county of Cuyahoga and State of Ohio, have invented certain new and useful Improvements in Storage Batteries; and I do declare that the following is a full, clear, and exact description of the invention, which will enable others skilled in the art to which it appertains to make and use the same.

My invention relates to storage batteries; and the object of the invention is to provide a battery which is especially adapted for portable uses, as in automobiles and the like constructed to be driven by electric power and necessarily carrying the source of power with them.

Hitherto the electrically driven or propelled vehicle has been largely objected to on account of the excessive load it has to carry to get the requisite amount and continuity of power for anything like a prolonged journey, such as a run of four to six hours, and which has necessitated the construction of a correspondingly heavy vehicle which could carry the load and not soon be racked to pieces. In all this the objection lies against the excessive weight of the battery itself, which is out of all proportion to the power stored and available, and hence I have conceived the idea of a battery in which the storage capacity will at least not be diminished, if it be not really materially increased, but which has the exceptional merit of lightness in pounds avoirdupois as compared with the batteries in common use.

To these ends my invention consists in a storage-battery plate constructed and adapted to operate substantially as shown and described, and particularly pointed out in the claims.

In the accompanying drawings, Figure 1 is a perspective inside view of one side or section of my new and improved plate, and Fig. 2 is a vertical cross-section of a complete plate filled with the active material. Fig. 3 is an enlarged cross-sectional view of a portion of one of the sides or sections of the complete plate and disclosing the electroplating or deposit upon its surface.

As thus shown, A represents the entire plate as seen in vertical section, Fig. 2, and $a$ and $a'$, respectively, represent the sides or sections constituting the said plate. Structurally the said sides or sections are alike and each is provided on its inside with a series of pockets formed by vertical ribs or walls 2 and cross-walls 3 at intervals, and the said walls match in the two sections and form pockets or chambers equal to the depth of both sets of ribs brought together. These pockets may have greater or less depth, as shall be found preferable, and the two sides are bolted, riveted, or brazed together, as preferred, and have a common binding-post 4 at their top.

Heretofore in storage batteries familiar to me the plate or element has been made of lead or a lead alloy and has served as a support for the active material, whether applied to the plate as a paste or developed upon or from the plate by electrolytic action; but the body of lead thus put into the plate made it unduly heavy, and hence objectionable, as already described. I overcome and avoid this objection by using an aluminium body or support cast into a grid or equivalent form, and then I electroplate the same with nickel or other relatively cheap conducting metal, which will help to protect the plate from the action of the electrolyte 6. Then having provided a light-weight and good conducting support which is exceptionally rigid and strong and will not buckle I fill the pockets thereof with aluminium cubes, balls, squares, granules, or other pieces or particles of fairly good size and also subjected to the plating process, preferably, and with these pieces or granules I incorporate such active material as is needed to completely fill the interstices thereof and finish the equipment of the said pockets. The outer surface of all the pockets is numerously and finely perforated to promote circulation and electrolytic action, and any suitable electrolyte may be used.

What I claim is—

1. In storage batteries, an aluminium plate provided with pockets and pieces of aluminium and active material filling said pockets, substantially as described.

2. In storage batteries, an aluminium plate having pockets filled with aluminium particles and said particles and plate electroplated with a conducting metal, and active material filling the interstices of said particles, substantially as described.

In testimony whereof I sign this specification in the presence of two witnesses.

CHARLES B. MORGAN.

Witnesses:
R. B. MOSER,
C. A. SELL.